No. 652,709. Patented June 26, 1900.
J. H. BAKER.
MANUFACTURE OF STRAPS FOR WAGONS, &c.
(Application filed Mar. 8, 1900.)
(No Model.) 6 Sheets—Sheet 1.

WITNESSES:
INVENTOR

No. 652,709. Patented June 26, 1900.
J. H. BAKER.
MANUFACTURE OF STRAPS FOR WAGONS, &c.
(Application filed Mar. 8, 1900.)
(No Model.) 6 Sheets—Sheet 2.

WITNESSES:
INVENTOR

No. 652,709. Patented June 26, 1900.
J. H. BAKER.
MANUFACTURE OF STRAPS FOR WAGONS, &c.
(Application filed Mar. 8, 1900.)
(No Model.) 6 Sheets—Sheet 3.
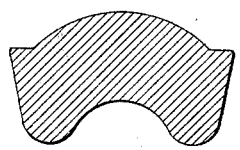
FIG.3
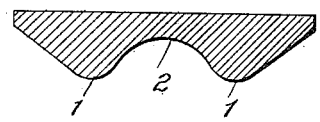
FIG.4.
FIG.5.
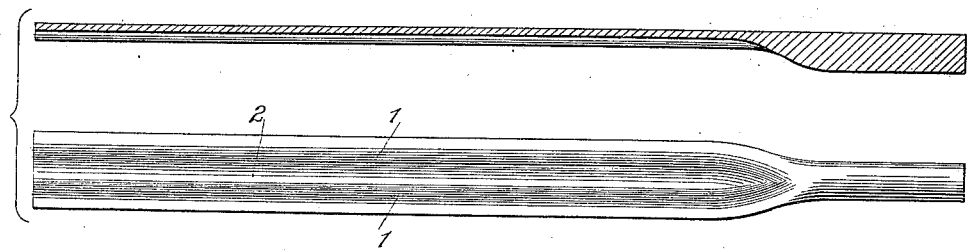
FIG.6.
FIG.7.
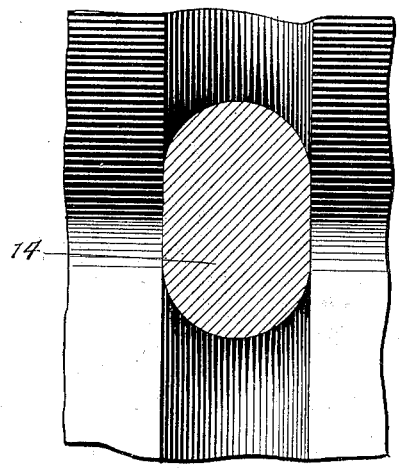
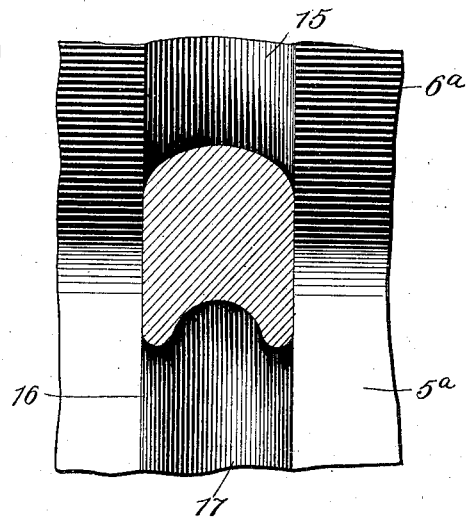
WITNESSES:
Herbert Bradley
F. E. Gaither
INVENTOR
James H. Baker
by Darwin S. Wolcott
Att'y.

No. 652,709. Patented June 26, 1900.
J. H. BAKER.
MANUFACTURE OF STRAPS FOR WAGONS, &c.
(Application filed Mar. 8, 1900.)
(No Model.) 6 Sheets—Sheet 4.

WITNESSES: INVENTOR
Herbert Bradley. James H. Baker
F. E. Gaither. by Dannis S. Wolcott Att'y No. 652,709. Patented June 26, 1900.
J. H. BAKER.
MANUFACTURE OF STRAPS FOR WAGONS, &c.
(Application filed Mar. 8, 1900.)
(No Model.) 6 Sheets—Sheet 5.

WITNESSES: INVENTOR

No. 652,709. Patented June 26, 1900.
J. H. BAKER.
MANUFACTURE OF STRAPS FOR WAGONS, &c.
(Application filed Mar. 8, 1900.)
(No Model.) 6 Sheets—Sheet 6.

WITNESSES:
Herbert Bradley
F. E. Gaither

INVENTOR
James H. Baker
by Dennis S. Wolcott Att'y.

THE NORRIS PETERS CO., PHOTO-LITHO., WASHINGTON, D. C.

UNITED STATES PATENT OFFICE.

JAMES H. BAKER, OF ALLEGHENY, PENNSYLVANIA, ASSIGNOR TO THE JAS. H. BAKER MANUFACTURING COMPANY, OF PITTSBURG, PENNSYLVANIA.

MANUFACTURE OF STRAPS FOR WAGONS, &c.

SPECIFICATION forming part of Letters Patent No. 652,709, dated June 26, 1900.

Application filed March 8, 1900. Serial No. 7,812. (No model.)

*To all whom it may concern:*

Be it known that I, JAMES H. BAKER, a citizen of the United States, residing at Allegheny, in the county of Allegheny and State of Pennsylvania, have invented or discovered certain new and useful Improvements in the Manufacture of Straps for Wagons, &c., of which improvements the following is a specification.

In an application of even date herewith I have described and claimed certain improvements in straps for wagons, &c., said straps consisting of a substantially-round stem and a body portion flat on one side and centrally grooved or recessed on the opposite side, said groove being designed for the reception of the heads of the fastening-rivets.

The object of the present invention is to provide for the manufacture of such straps by the flattening out and laterally spreading of portions of a round rod or approximately round in cross-section, such as oval or polygonal, by rolling between suitably-constructed rolls.

The invention is hereinafter more fully described and claimed.

Figure 1:
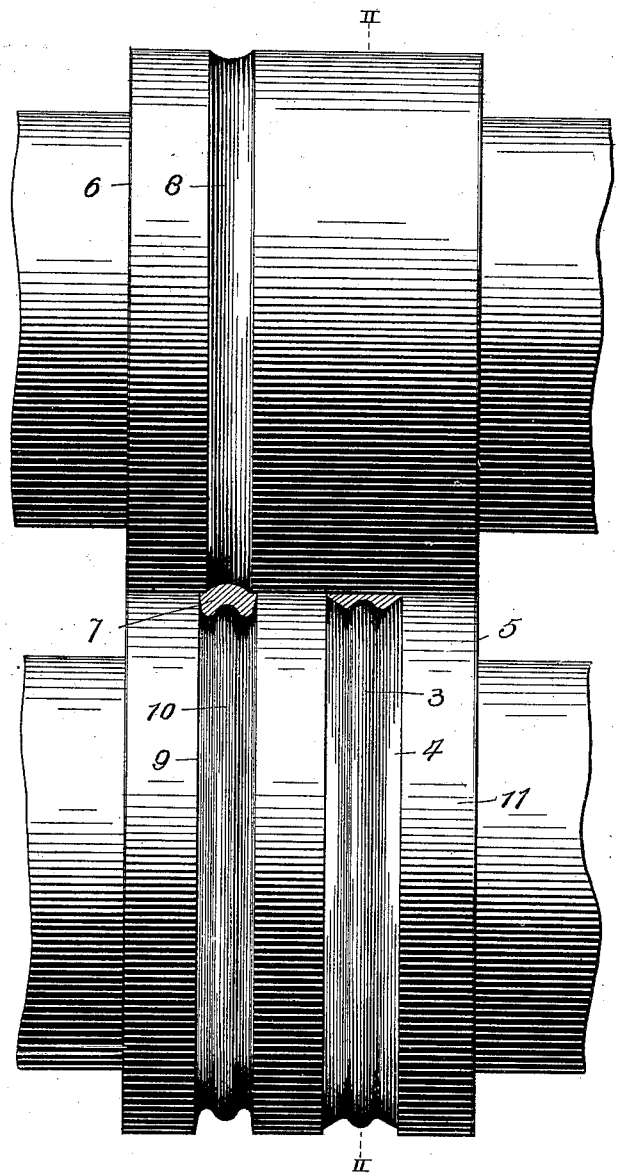
Figure 2:
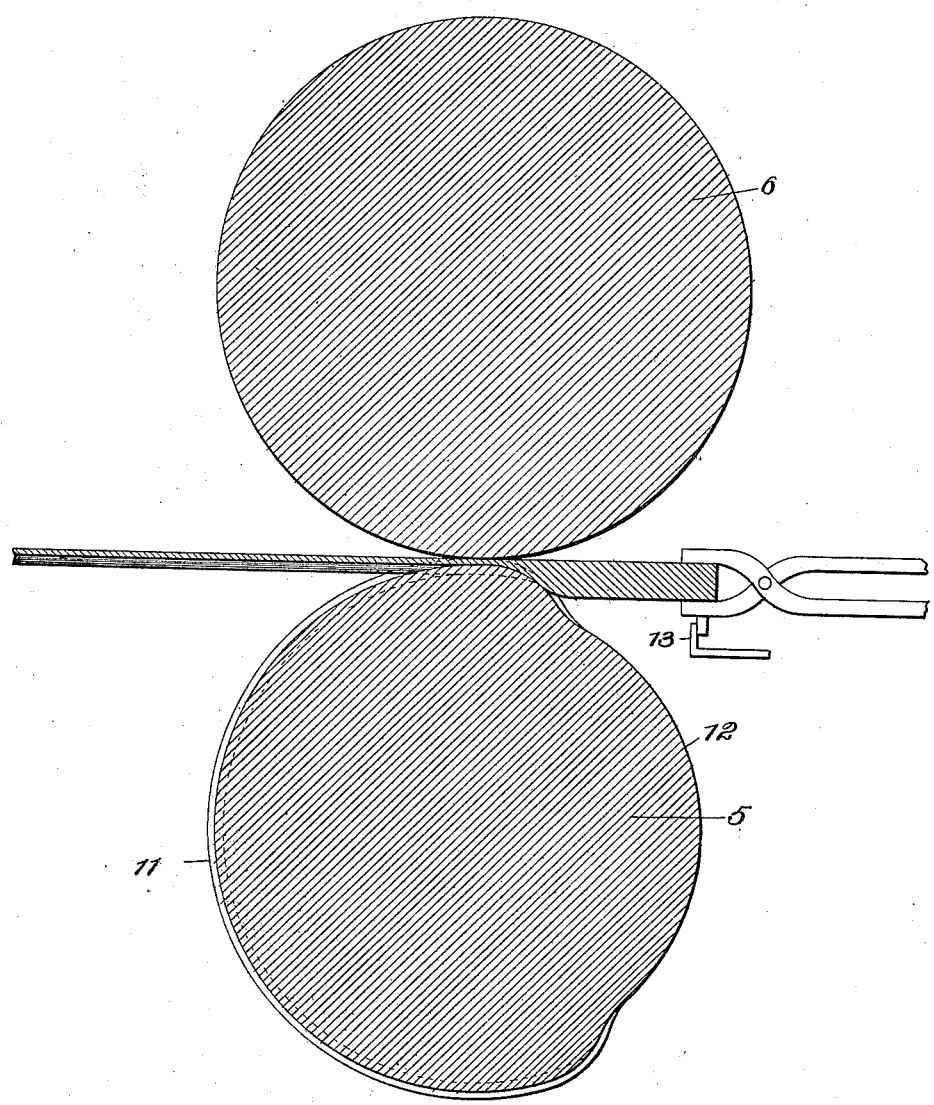
Figure 8:
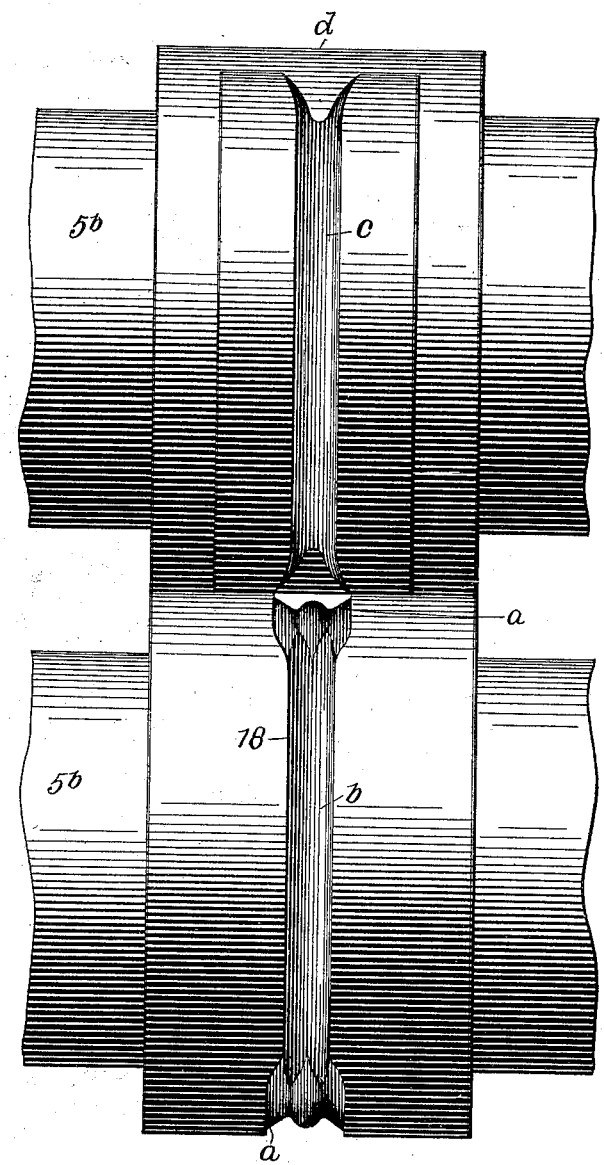
Figure 9:
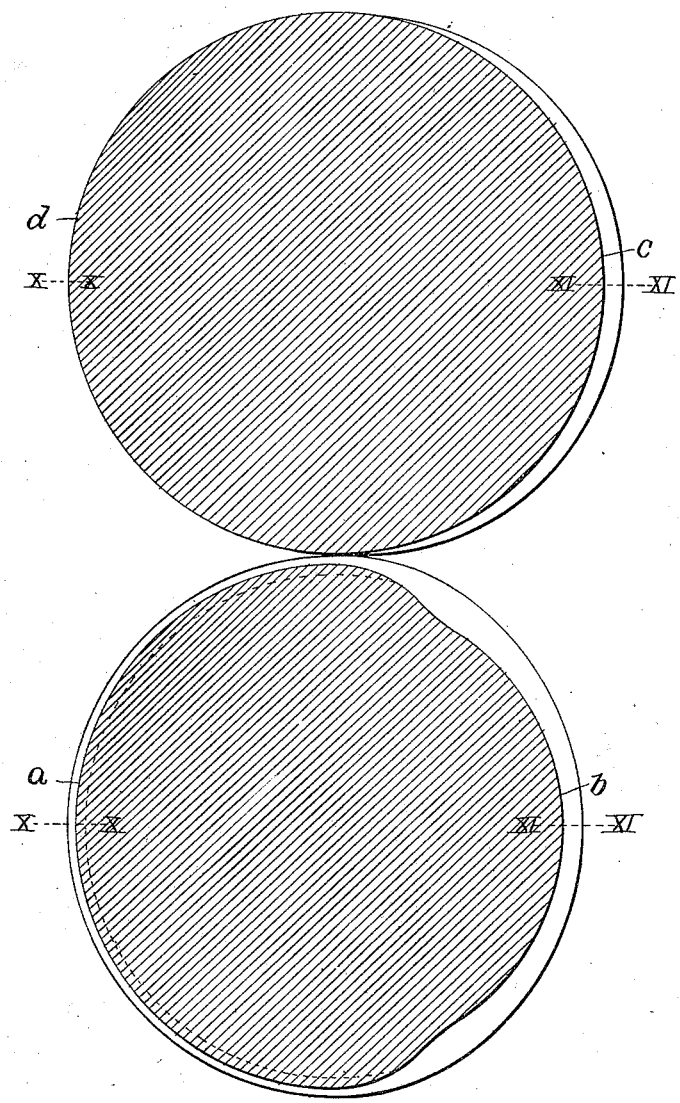
Figure 10:
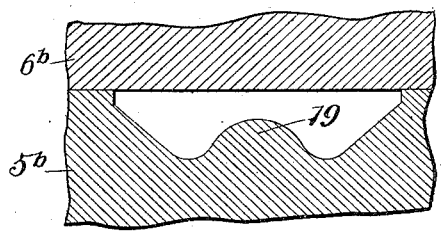
Figure 11:
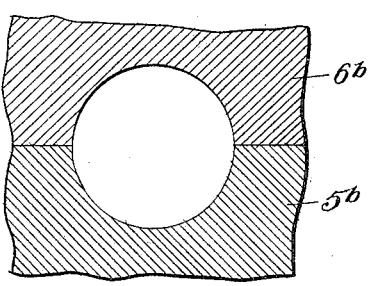
Figure 12:
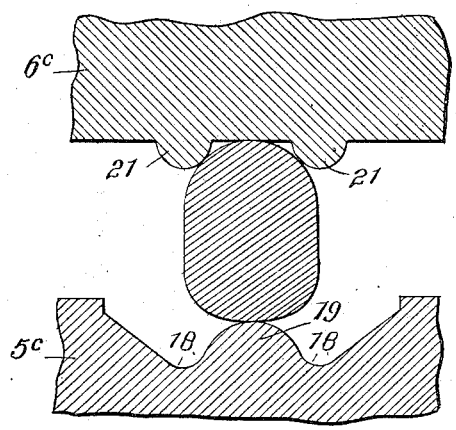
Figure 13:
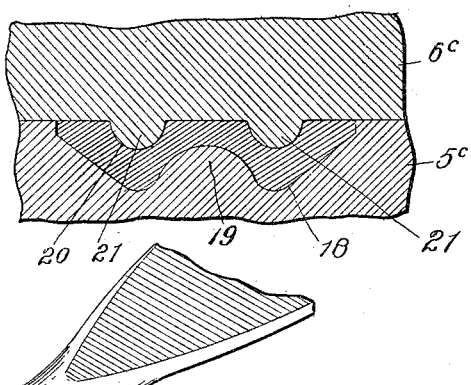
Figure 14:
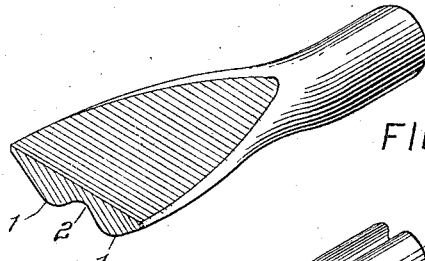
Figure 15:
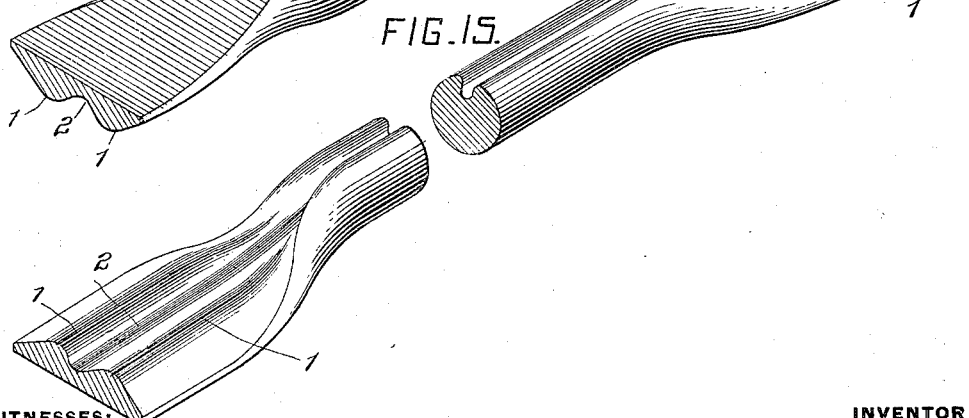

In the accompanying drawings, forming a part of this specification, Figure 1 is a front elevation of a pair of rolls adapted to the practice of my invention. Fig. 2 is a sectional view, the plane of section being indicated by the line II II, Fig. 1. Figs. 3 and 4 are transverse sections showing the shapes produced in the passes of the rolls shown in Fig. 1. Fig. 5 shows in plan and section the strap produced by the rolls in Fig. 1. Figs. 6 and 7 are views, partly in elevation, of portions of rolls having passes for the progressive reduction of the rod preparatory to the final shaping-pass. Fig. 8 is a view in elevation of rolls having a pass for final shaping of the rod. Fig. 9 is a transverse section of the same. Figs. 10 and 11 are sectional views showing the contour of the pass at different parts of the roll, the respective planes of section being indicated by the lines X X and XI XI, Fig. 9. Figs. 12 and 13 are views similar to Figs. 10 and 11, illustrating a modification in the shape or contour of the final pass. Figs. 14 and 15 are perspective views showing the two sides of the bar formed in passes shown in Figs. 10 and 11.

In order to produce the strap shown in Fig. 4, it is necessary not only to flatten the rod and effect a lateral spreading of the metal of a portion of the rod, but also to effect an even distribution of the metal in ridges or ribs 1 along and adjacent to the edges of the flattened portion. The metal forming these ridges is displaced laterally from the center of the rod, so that a central groove 2 is produced in the finished strap. This displacement of the metal and consequent formation of the groove are produced by a rib or bead 3, formed in the groove 4 of the roll 5. If it should be attempted to feed a round rod into the pass formed by the groove 4, the rod, being of a diameter less than the width of the pass or groove 4, could not be held with its axis above the rib or bead 3 and would drop off the rib or bead on one side or the other.

As guides or rests such as are ordinarily employed in bar-mills cannot be placed sufficiently close to the rolls to hold the bar in proper position while passing through the rolls, I provide for the proper guidance of the article by a preliminary shaping of the bar. To this end I provide a pass 7 in the rolls 5 and 6 alongside of the pass 4 or in another pair of rolls. As shown in Figs. 1 and 3, this pass is formed in part by a transversely-curved groove 8 in one of the rolls and in part by a groove 9 in the other roll. In the bottom of the groove 9 is formed a rib or bead 10, which preliminarily spreads the metal of the rod laterally, forming the ridges along the edges of the article. In this pass the rod is held centrally on the rib or bead 10 by the transversely-curved groove 8 in the other roll. After reduction and preliminary shaping in pass 7 the blank thus formed is fed into pass 4, the bead or rib 3 of said pass entering the groove in the blank, so that the ridges along the edges of the blank serve as guides to insure the proper movement of the blank through the pass.

Two methods may be employed in the manufacture of straps—that is, the rod may be cut into sections of suitable length and one end heated and shaped by the rolls, or a long length of rod may be passed through rolls forming a series of connected straps, which are subsequently cut apart.

In making straps according to the first method the passes or grooves 4 and 7 are formed on a raised or eccentric portion 11 of the roll 5 and the roll 6 is made plain or ungrooved. The bar-section is then heated and the workman with a pair of pincers inserts one end of the rod between the rolls in line with the pass or groove 8 when the depressed or unraised portion 12 of the roll 5 is opposite the roll 6. As the rolls rotate the rod-section is caught and preliminarily shaped. It is preferred that the rolls should rotate toward the workman, so that he may retain his hold on the end of the rod-section and transfer the partially-shaped blank as soon as it has been fed out from pass or groove 7 to pass 4 without reheating, it being inserted between the rolls in line with pass 4 when the depressed portion of roll is opposite and adjacent to roll 6. In order that the proper length of the rod-section may be shaped, a stop 13 may be placed in front of or in the rear of the rolls.

In rolling long lengths of rod to form a series of connected blanks the shapes of the pass should be somewhat modified, as it is practically impossible to effect a shaping of portions of a rod by a series of passes on account of the necessity of starting the rod into the passes at a certain time and on account of the difference of elongation effected in the several passes. Hence in rolling long lengths the rod is shaped or reduced for its entire length in every pass.

It is preferred, although not necessary, to start with a rod oval in cross-section or of such other cross-sectional shape which has at least one of its transverse dimensions greater than the desired diameter of stem in the finished strap. To this end the heated rod, if round, is first put through the pass 14 to bring it to the desired cross-sectional shape. The next pass in which the preliminary groove is formed along one side of the blank is formed in part by a groove 15 in roll $6^a$, conforming or approximately conforming in contour to the shape of the rod on the side opposite that on which the ridges are to be formed and in part by a groove 16 in roll $5^a$ having in its bottom a rib or bead 17. In this pass the rod is held centrally over the rib 17 while entering between the rolls by the groove 15 in the roll $6^a$. From this pass the blank is fed into the final shaping-pass in rolls $5^b$ $6^b$. In this pass portions of the blank are flattened and spread laterally to form the body portions of the straps, and portions are brought to a round in cross-section to form the stems of the straps. To this end a portion $a$ of the groove 18 in the roll $5^b$ is shaped, as shown in Figs. 8, 9, and 10, to produce the flattened portions, and a portion $b$ is constructed to act in conjunction with the portion $c$ of the other roll $6^b$ to reduce portions of the blank to a round in cross-section, as shown in Figs. 8, 9, and 11. The portion $d$ of the roll $6^b$ which operates in conjunction with the part $a$ of the roll $5^b$ is made plain or ungrooved. As the blank produced in the prior pass is fed into this final shaping-pass it will be held centrally therein by the ridges of the blank passing along each side of the rib or bead 19 in the bottom of the groove 18.

Although the preliminary groove formed in one side of the blank in the next to the last pass will not be entirely obliterated from the stem portion of the strap, it will be so closed up and being longitudinal of the stem will not in any way lessen its transverse strength. For some articles the groove in the stem portion of the strap is desirable, and in such cases the portions of the last pass which forms the stem are so proportioned as not to effect any substantial closing of the groove.

As shown in Fig. 13, the rear or flat side of the body of the strap may be grooved. These grooves 20 are on opposite sides of a plane passing between the ridges formed on the front side of the strap and preferably in line with such ridges, which in such case would be concavo-convexed. The grooves in the flat side are formed by ribs or beads 21 on the roll $6^c$. In rolling this form of strap the rod need not be preliminarily grooved, as the ribs or beads 21 on roll $6^c$ will bear on opposite sides of the blank and hold it in position on the rib or bead 19 in the groove 18 of roll $5^c$. In this method the portion of the blank entering between the ribs or beads 21 forms the guiding portion of the blank.

I claim herein as my invention—

1. As an improvement in the art of rolling grooved straps for wagons, &c., from rods substantially round in cross-section, the method herein described, which consists in imparting to the rod in one pass such a transverse contour that at least a portion of its perimeter will conform to or approximately to a portion of the next pass, whereby the article may be guided and held in proper position while being reduced in such pass, and then flattening and laterally spreading sections or parts of the rod and forming a longitudinal groove in the flattened portions in such succeeding pass, substantially as set forth.

2. As an improvement in the art of rolling straps for wagons, &c., having a ribbed flattened portion, the method herein described, which consists in forming guide-ribs along the article in one pass and then flattening and laterally spreading portions or sections of the blank formed in the first pass, substantially as set forth.

3. The method herein described of forming straps having grooved body portions which consists in forming in one pass a guide-groove along one side of the rod and then flattening and laterally spreading the portions or sections of the blank equally on both sides of the groove, substantially as set forth.

4. The method herein described which consists in forming a rod having one cross-sectional dimension greater than the diameter desired in the stem portion of the strap, forming a groove in the rod in line with such greater dimension and the laterally-spreading portions of the rod on both sides of said groove and bringing the portions intermediate of the flattened parts to a round cross-section, substantially as set forth.

In testimony whereof I have hereunto set my hand.

JAMES H. BAKER.

Witnesses:
DARWIN S. WOLCOTT,
F. E. GAITHER.